(12) United States Patent
Remy

(10) Patent No.: US 6,449,468 B1
(45) Date of Patent: Sep. 10, 2002

(54) MOBILE RADIOCOMMUNICATION TERMINAL COMPRISING AT LEAST TWO ANTENNAS WITH A DIVERSITY OF POLARIZATIONS FOR SIGNAL RECEPTION

(75) Inventor: M. Jean-Gabriel Remy, le Perreux (FR)

(73) Assignee: Societe Francaise du Radiotelephone, Paris la Defense (FR)

( * ) Notice: Subject to any disclaimer, the term of this patent is extended or adjusted under 35 U.S.C. 154(b) by 0 days.

(21) Appl. No.: 09/362,245

(22) Filed: Jul. 28, 1999

(51) Int. Cl.$^7$ .............................................. H04B 17/02
(52) U.S. Cl. .................... 455/135; 455/137; 455/277.1; 455/278.1; 375/347
(58) Field of Search ................................ 455/132, 133, 455/135, 137, 101, 277.1, 134, 277.2, 277.8; 375/267, 347; 714/786, 794, 795

(56) References Cited

U.S. PATENT DOCUMENTS

| | | | |
|---|---|---|---|
| 5,513,176 A | * | 4/1996 | Dean et al. ................... 370/18 |
| 5,530,725 A | * | 6/1996 | Koch .......................... 375/347 |
| 5,564,082 A | * | 10/1996 | Blonder et al. ............... 455/90 |
| 5,606,733 A | | 2/1997 | Kanayama et al. ......... 455/273 |
| 5,841,816 A | * | 11/1998 | Dent et al. ................... 375/331 |
| 5,926,503 A | * | 7/1999 | Kelton et al. ................ 375/206 |
| 6,021,317 A | * | 2/2000 | Irvin ............................ 455/78 |
| 6,049,705 A | * | 4/2000 | Xue .......................... 455/277.1 |
| 6,167,243 A | * | 12/2000 | Wang et al. ................. 455/137 |
| 6,181,920 B1 | * | 1/2001 | Dent et al. ................... 455/101 |
| 6,229,824 B1 | * | 5/2001 | Marko ......................... 370/477 |

FOREIGN PATENT DOCUMENTS

| | | |
|---|---|---|
| DE | 195 48 941 A1 | 12/1995 |
| EP | 0 645 900 A2 | 8/1994 |
| EP | 0 831 598 A1 | 9/1996 |
| WO | 97/40588 | 10/1997 |

* cited by examiner

*Primary Examiner*—Edward F. Urban
*Assistant Examiner*—Temica M. Davis
(74) *Attorney, Agent, or Firm*—Kinney & Lange, P.A.

(57) ABSTRACT

A mobile radiocommunication terminal includes a first antenna with a first polarization and a second antenna with a second polarization. The antennas are separate and are both used to receive signals. Signals received by the first and second antennas are combined in polarization diversity. Specifically, for each distinct polarization, a Viterbi decoding means outputs the most probable signals and a probability factor associated with the most probable signals. A digital signal processor includes, for each distinct polarization, weighting means that weight the most probable signals by the associated probability factor, and means for summating the signal outputs from the weighting means.

17 Claims, 2 Drawing Sheets

MOBILE RADIOCOMMUNICATION TERMINAL COMPRISING AT LEAST TWO ANTENNAS WITH A DIVERSITY OF POLARIZATIONS FOR SIGNAL RECEPTION

This invention relates to the domain of radiocommunication systems with mobiles.

More precisely, the invention relates to mobile radiocommunication terminals used in this type of system.

The invention is applicable to any mobile radiocommunication terminal designed to receive and possibly emit signals, and particularly but not exclusively for radiocommunication systems of the GSM 900 (Global System for Mobile operating within the 900 MHz band) type, or the DCS 1800 (Digital Cellular System 1800 MHz) type, or the PCS 1900 (Personal Communication System 1900 MHz) type, or the UMTS (Universal Mobile Telecommunication System 2 GHz) type, or the CDMA (Coded Division Multiple Access) type.

Note that a mobile radiocommunication terminal is physical equipment used by a user of a radiocommunication system network to access telecommunications services offered through a base station.

Note also that a base station covers a given geographic area (or cell) in which many mobile radiocommunication terminals can move, and with which the base station can exchange signals.

Depending on the system, the mobile radiocommunication terminal may be called a mobile station, a portable telephone, a mobile radiotelephone, or a radiocommunication terminal. The expression "mobile terminal" will be used throughout the remainder of this patent document, for simplification purposes.

Conventionally, a mobile terminal comprises at least one antenna designed to receive and/or transmit signals from and/or to a base station.

Also conventionally, a "whip" type antenna with a linear polarization is used.

In general, it is observed that signals exchanged between the mobile terminal and the base station are subject to fading and/or echoes and/or interference that can generate partial or total loss of the transported information.

Note that:

fading phenomena occur particularly when two signals with similar powers and opposite phases reach the same reception antenna at the same time, the resulting signal therefore being practically zero;

echo phenomena are generated particularly by transmitted signals that "reflect" on obstacles encountered on the path between a mobile terminal and the corresponding base station;

interference phenomena are provoked particularly when signals with similar characteristics (such as frequency) are being carried in the same propagation medium.

In other words, exchanged signals are subject to disturbances caused particularly by propagation conditions (sometimes difficult) in the transmission medium. Therefore, it is easy to understand that this type of disturbance can generate crucial problems concerning the quality of signals transmitted by a base station and retrieved by a mobile terminal.

Thus, it is sometimes difficult to use signals received by the mobile terminal.

Furthermore, the position of the antenna on the mobile terminal is such that its radiation is partly absorbed particularly by the user's head, when the user keeps the mobile terminal close to his ears. Consequently, this proximity between the mobile terminal and the user's head partially reduces the energy received and emitted by the mobile terminal.

Finally, the reception quality of the mobile terminal usually depends on the position of the mobile terminal and/or its orientation with respect to the base station.

The purpose of this invention is to overcome these various disadvantages with the state of the art.

More precisely, one of the purposes of this invention is to provide a mobile terminal with good reception quality even under difficult conditions (and particularly in the presence of fading phenomena and/or interference and/or echoes).

Another purpose of the invention is to provide this type of mobile terminal capable of obtaining reception practically independent of the position and/or orientation of the mobile terminal with respect to the base station.

Another purpose is to provide this type of mobile terminal that does not modify exchanged signals while maintaining a good reception quality.

These various purposes, and others which will become clearer later, are achieved according to the invention by means of a mobile radiocommunication terminal of the type used in a radiocommunication system, characterized in that it comprises:

at least one first antenna, used in reception and with at least a first polarization;

at least one second antenna, used in reception and with at least one second polarization, separate from the first polarization; and means of combining the received signals, in polarization diversity, by the said first and second antennas.

Therefore the general principle of this invention is based on the association of several distinct polarizations used in reception mode.

It will be understood that the diversity of polarizations makes it possible to offer several distinct reception channels, namely one or more for the first polarization(s) and one or more for the second polarization(s).

Thus, a combination of various polarizations increases the probability of correct reception of signals emitted by the base station. In particular, this results in a gain of a few dB in the reception sensitivity. Consequently, the increased probability of signal reception makes the mobile terminal much less sensitive to fading and/or interference and/or echo phenomena.

Note that the reduction in the influence particularly of fading phenomena on signal reception enables better performance of power control algorithms (Rayleigh or Rice process).

Consequently, the mobile terminal according to the invention can work under difficult conditions for propagation of signals in the transmission medium.

Note that the different reception channels with distinct polarizations are preferably independent and decorrelated from each other, in order to optimize the manner in which the mobile terminal processes received signals. It is obvious that an expert in the subject would know how to use the different antennas such that the different reception channels generated are independent and decorrelated from each other.

The means of combining the received signals are the means that make it possible to optimally process signals received from the various possible reception channels, in order to rebuild the signals transmitted by the base station as faithfully as possible.

Advantageously, the said first polarization belongs to the group comprising rectilinear polarizations.

Preferably, the said second polarization belongs to the group comprising:
circular polarizations,
elliptical polarizations.

Note that the fact that there is at least one circular polarization in association with at least one linear polarization enables the mobile terminal to receive signals intended for it independently of its position and/or orientation with respect to the base station.

Advantageously, the said first antenna(s) belong(s) to the group comprising:
whip antennas;
panel antennas.

Obviously, this list is not restrictive.

Preferably, the said second antenna(s) belong(s) to the group comprising panel antennas.

This list is not exhaustive.

Preferably, the said antenna(s) is (are) used with a double polarization, right and left.

In this way, a total of three separate polarizations (two circular and one linear) is obtained. The use of this type of double circular polarization contributes to reducing the influence of fading and/or interference and/or echo phenomena on signals received by the mobile terminal.

In one preferred embodiment of the invention, the said first antenna(s) is (are) also used in transmission.

In one preferred embodiment of the invention, the said means of combining received signals comprise:
for each distinct polarization, Viterbi decoding means outputting firstly the most probable signals, and secondly a probability factor associated with the said most probable signals;
digital signal processing (DSP) means comprising:
for each distinct polarization, weighting means weighting the most probable signals for each distinct polarization by the associated probability factor;
means of summating the signals output from the various weighting means.

This type of Viterbi decoding means determines the most probable information transported by signals received by the mobile terminal on each of the reception channels. The Viterbi decoding means that use the Viterbi algorithm are well known to the expert in the subject, and therefore are not described here.

However, it is obvious that an expert in the subject would know how to use other decoding types without going outside the framework of this invention.

Thus, the received signals on the various reception channels can be efficiently processed in base band since signals output from the first and second antennas are summated taking account of weighting factors, that are their probability factors.

According to one advantageous variant, the said means of combining the received signals comprise:
polarization selection means, that select the polarization for which the received signals have the maximum power,
Viterbi decoding means receiving signals received with the selected polarization and outputting firstly the most probable received signals, and secondly a probability factor associated with the said most probable received signals.

In this way, only the reception channel on which the highest power signals are received is preserved and processed optimally by the Viterbi decoding means.

Preferably, the said radiocommunication system belongs to the group comprising:

GSM 900 type systems;
DCS 1800 type systems;
PCS 1900 type systems;
UMTS FDD type systems;
UMTS TDD type systems;
CDMA type systems.

However, this list is not exhaustive.

Other characteristics and advantages of the invention will become obvious after reading the following description of a preferred embodiment of the invention, given for explanatory purposes and in no way restrictive, and the attached drawings in which.

Figure 1:
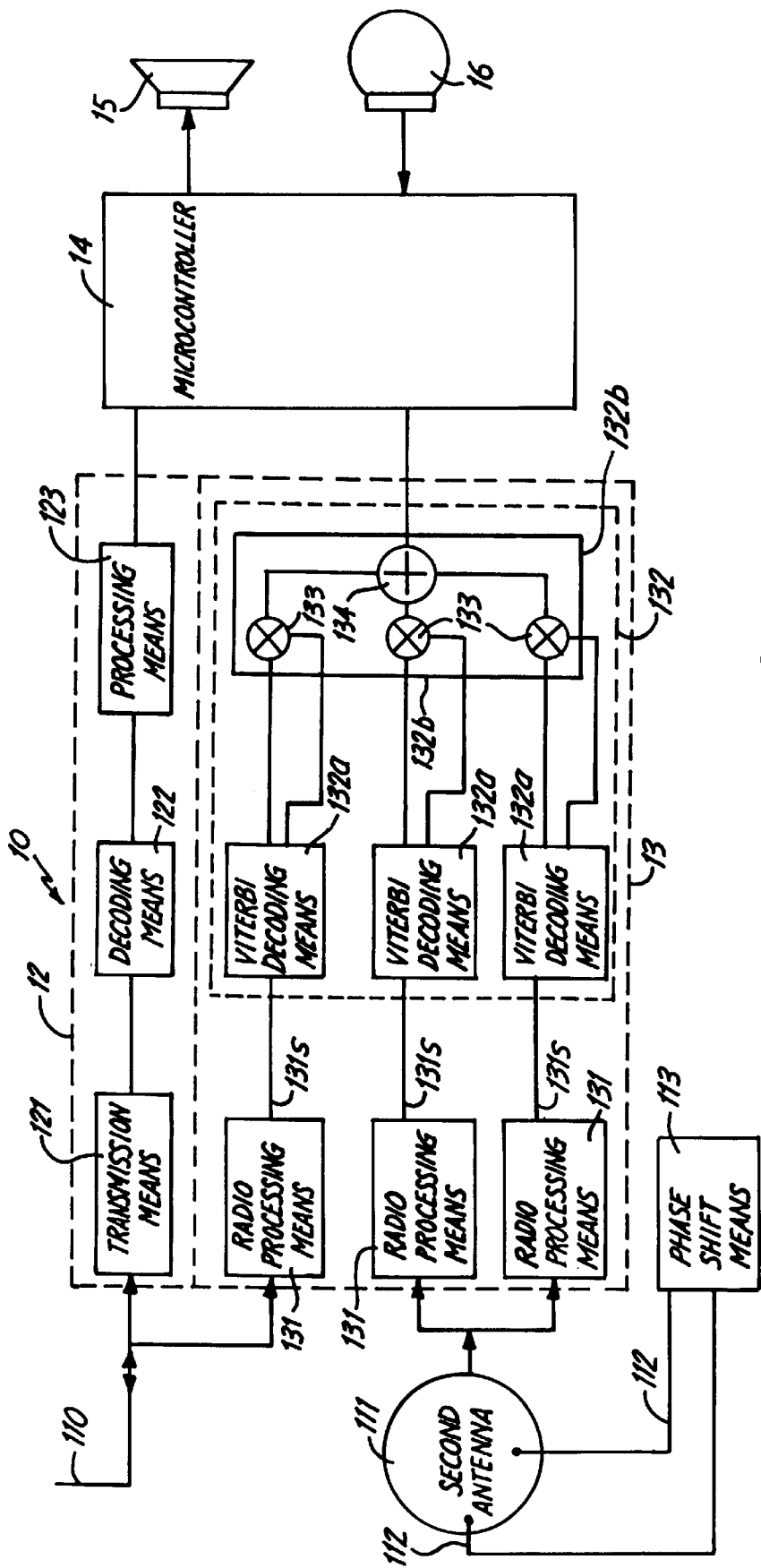
FIG. 1 shows a simplified block diagram of a particular embodiment of a mobile terminal according to the invention.

Conventionally, a mobile terminal 10 used in a radiocommunication system comprises particularly an antenna 110, a transmission system 12 and a micro-controller 14. For example, the radiocommunication system may be of the GSM 900, DCS 1800, PCS 1900, UMTS FDD, UMTS TDD or CDMA type.

The transmission system 12 is not described in detail since it is known in itself and may be made in many different ways. In this example, the transmission system 12 comprises means 121 necessary for transmission of signals by the antenna 110 (conventionally digital/analog conversion, transfer in the radio-frequencies band, filtering, amplification, modulation, etc.), encoding means 122 particularly for voice, the channel and processing means 123 (interlacing, etc.). The micro-controller 14 controls all operations done by the mobile terminal 10 in a manner known in itself, and in particular reproduces voice signals through at least one loudspeaker 15, and retrieves voice signals output from at least one microphone 16. Voice signals and signaling signals generated by the mobile terminal 10 should be sent through the transmission system 12 to a base station (not shown). Conversely, voice signals and signaling signals transmitted by the base station are received by the mobile terminal 10 through a reception system 13.

According to the invention, the mobile terminal 10 comprises the following in reception:
at least one first antenna 110 with at least one first polarization;
at least one second antenna 111 with at least one second polarization distinct from the first polarization; and
means 132 of combining the signals received, in polarization diversity, by the first and second antennas.

Therefore, this arrangement of means 110, 111, 132 offers a diversity of polarizations in reception with several distinct, independent and decorrelated reception channels. This is very useful since the combination means 132 make optimum use of the received signals. The result is a gain of a few dB in reception sensitivity. Consequently, this increases the chances of reception of signals transmitted to the mobile terminal 10. Consequently, reception of signals by the mobile terminal 10 is improved, thus improving resistance to fading and/or interference and/or echo phenomena.

Furthermore, the user of the mobile terminal 10 generates less disturbances (energy absorption, obstacles, etc.), particularly for reception of signals intended for his mobile terminal 10.

Note in particular that the invention is compatible with operation in "full duplex". "Full duplex" operation means permanent operation in transmission and reception on each frequency channel.

The first antenna 110 has a first polarization in reception, and provides at least one reception. channel. This first antenna can also be used in transmission. Therefore, optimum use is made of available resources to transmit signals to a base station.

The second antenna 111 has a second polarization distinct from the first polarization. It may be a circular polarization or an elliptical polarization. For example, this antenna 111 may provide at least two additional reception channels with a double polarization. These two additional reception channels are different, independent and decorrelated from the first channel mentioned above.

For example, the second antenna 111 is made with a double polarization, right and left. In doing this, there are two separate input points 112 to the second panel antenna 111, connected to phase shift means 113 (or a phase shifting network).

Means 131 necessary for radio processing of signals received by antennas 110 and 111 (conventionally amplification, filtering, transfer in base band, analog/digital conversion, etc.), are provided on each of the three reception channels in a manner known in itself. For each distinct polarization, these means 131 output processed signals 131$s$, to Viterbi decoding means 132$a$.

These Viterbi decoding means 132$a$ output the most probable sequences of data transported in the received signals and the probability factor associated with a digital signal processor (DSP) 132$b$. This processor 132$b$ comprises weighting means 133 and summating means 134. For each distinct polarization, weighting means 133 weight the most probable signals from each distinct polarization using the associated probability factor also output by the Viterbi decoding means 132$a$.

The various weighting means 133 output the most probable signals, each weighted by its probability factor, to the summation means 134. These summation means 134 summate signals output from the various polarizations, and produce optimum output of the processed signals to the micro-controller 14.

According to one variant embodiment, an ASIC (Application Specific Integrated Circuit) can be included in the combination means 132 instead of the DSP which may also carry out some functions of the micro-controller 14.

Note that the invention is particularly effective against fading phenomena. Consequently, the performance of the power control algorithms is improved. This type of power control is particularly beneficial for CDMA, UMTS FDD and UMTS TDD type systems.

Combination means 132 output combined signals to the micro-controller 14. This micro-controller 14 processes the combined signals using the modulation adapted to the radiocommunication system, in a manner known in itself.

Figure 2:
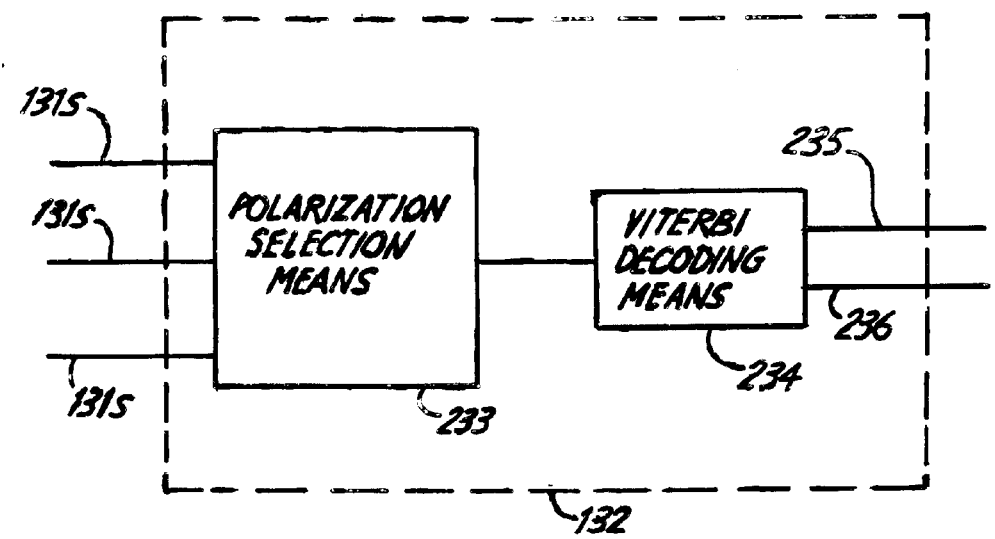
FIG. 2 shows a simplified block diagram of a variant embodiment of the means of combining the received signals, different from that in FIG. 1.

We will now present a second particular embodiment of the means 132 for combining the received signals, with reference to the block diagram in FIG. 2.

According to this variant embodiment, means 132 of combining the received signals comprise means 233 of selecting a polarization and Viterbi decoding means 234.

Signals 131$s$ output from the radio processing means 131 of signals described above (see FIG. 1) with a reception power measured by and for each reception channel, are input into the polarization selection means 233. These means 233 select a reception channel among the various signal reception channels, using the highest reception power of the signals received by the various reception channels. The selection means 233 output signals received on the strongest reception channel to the Viterbi decoding means 234. Therefore according to this second embodiment, only one of the various reception channels is selected, rather than a combination of the various reception channels (see FIG. 1), and this is referred to as switching diversity.

The Viterbi decoding means 234 output firstly the most probable sequences 235 of data transported in signals received on the selected reception channel, and secondly the associated probability factor 236, to the micro-controller 14 (see FIG. 1).

Figure 3:
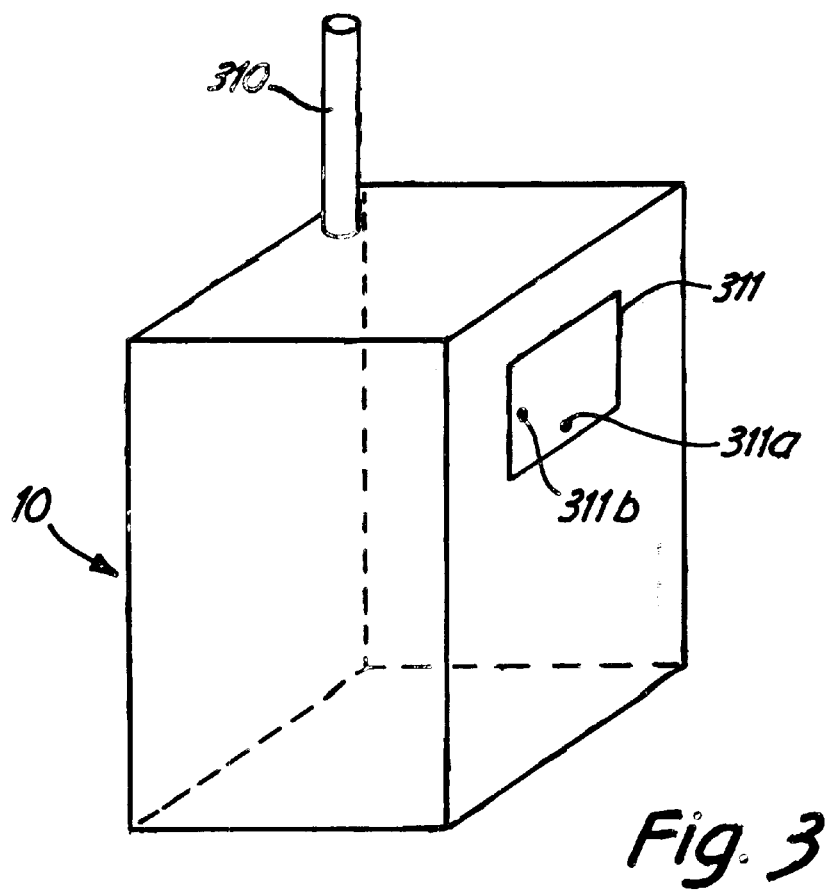
FIG. 3 shows a simplified block diagram of a particular embodiment of the mobile terminal in FIG. 1.

We will now describe a particular embodiment of the mobile terminal according to the invention, in relation to the simplified block diagram in FIG. 3.

The mobile terminal 10 comprises a first and a second antenna 310 and 311.

The first antenna 310 is of the "whip" type and is used in transmission and reception. This antenna 310 has a first linear polarization in reception mode. According to one variant embodiment, a "panel" type antenna could also be used as the first antenna 310 in reception mode.

The second antenna 311 is of the "panel" type. This type of antenna is known in itself and it will not be described in further detail in this description. This antenna is used only in reception. It has a double circular polarization, right and left, by means of a phase shifted input at two input points 311$a$ and 311$b$ connected to a phase shifting network.

Consequently, in reception this mobile terminal 10 offers three distinct polarizations decorrelated from each other. In practice, an attenuation of a few tens of dBs (for example 30 dB) is observed between right polarization and left polarization of the second antenna 311.

The radiation generated by these two antennas 310 and 311 are different and do not interact at all, or very little.

However if necessary, at least one electrical screen can be used between the two antennas 310 and 311 to limit the influence of radiation of one of the antennas on the radiation of the other antenna.

Note that a linear polarization is a means of picking up signals in a broader manner than is possible with circular polarization. In practice, the coverage achieved using linear polarization is of the order of twice as good as the coverage obtained with circular polarization.

What is claimed is:

1. Mobile radiocommunication terminal of a type used in a radiocommunication system, characterized in that it comprises:

at least one first antenna, used in reception and with at least a first polarization;

at least one second antenna, used in reception and with at least one second polarization, separate from the said first polarization; and means of combining received signals, in polarization diversity, by the said first and second antennas, said means for combining the received signals comprising:

for each distinct polarization, Viterbi decoding means outputting firstly the most probable signals, and secondly a probability factor associated with the said most probable signals;

digital signal processing means comprising:

for each distinct polarization, weighting means weighting the most probable signals for each distinct polarization by the associated probability factor;

means of summating the signals output from the various weighting means.

2. Mobile radiocommunication terminal according to claim 1, characterized in that the said first polarization belongs to the group comprising linear polarizations.

3. Mobile radiocommunication terminal according to claim 1, characterized in the said second polarization belongs to the group comprising:
- circular polarizations,
- elliptical polarizations.

4. Mobile radiocommunication terminal according to claim 1, characterized in that the said first antenna(s) belong(s) to the group comprising:
- whip antennas;
- panel antennas.

5. Mobile radiocommunication terminal according to claim 1, characterized in that the said second antenna(s) belong(s) to the group comprising panel antennas.

6. Mobile radiocommunication terminal according to claim 5, characterized in that the said second antenna(s) is (are) used with a double circular polarization, right and left.

7. Mobile radiocommunication terminal according to claim 1, characterized in that the said first antenna(s) is (are) also used in transmission.

8. Mobile radiocommunication terminal according to claim 1, characterized in that the said means of combining the received signals comprise:
- polarization selection means that select the polarization for which the received signals have the maximum power,
- Viterbi decoding means receiving signals received with the selected polarization and outputting firstly the most probable received signals, and secondly a probability factor associated with the said most probable received signals.

9. Mobile radiocommunication terminal according to claim 1, characterized in that the said radiocommunication system belongs to the group comprising:
- GSM 900 type systems;
- DCS 1800 type systems;
- PCS 1900 type systems;
- UMTS FDD type systems;
- UMTS TDD type systems;
- CDMA type systems.

10. A mobile radiocommunication terminal of a type used in a radiocommunication system, characterized in that it comprises:
- at least one first antenna, used in reception and with at least a first polarization;
- at least one second antenna, used in reception and with at least one second polarization, separate from the said first polarization; and
- means of combining received signals, in polarization diversity, by the said first and second antennas, said means of combining the received signals comprising:
  - polarization selection means that select the polarization for which the received signals have the maximum power,
  - Viterbi decoding means receiving signals received with the selected polarization and outputting firstly the most probable received signals, and secondly a probability factor associated with the said most probable received signals.

11. Mobile radiocommunication terminal according to claim 10, characterized in that the said first polarization belongs to the group comprising linear polarizations.

12. Mobile radiocommunication terminal according to claim 10, characterized in the said second polarization belongs to the group comprising:
- circular polarizations,
- elliptical polarizations.

13. Mobile radiocommunication terminal according to claim 10, characterized in that the said first antenna(s) belong(s) to the group comprising:
- whip antennas;
- panel antennas.

14. Mobile radiocommunication terminal according to claim 10, characterized in that the said second antenna(s) belong(s) to the group comprising panel antennas.

15. Mobile radiocommunication terminal according to claim 14, characterized in that the said second antenna(s) is (are) used with a double circular polarization, right and left.

16. Mobile radiocommunication terminal according to claim 10, characterized in that the said first antenna(s) is (are) also used in transmission.

17. Mobile radiocommunication terminal according to claim 10, characterized in that the said radiocommunication system belongs to the group comprising:
- GSM 900 type systems;
- DCS 1800 type systems;
- PCS 1900 type systems;
- UMTS FDD type systems;
- UMTS TDD type systems;
- CDMA type systems.

* * * * *